United States Patent
Kempf et al.

(10) Patent No.: US 9,109,550 B2
(45) Date of Patent: Aug. 18, 2015

(54) MODULAR DESIGN FOR FUEL VAPOR PURGING IN BOOSTED ENGINES

(75) Inventors: David Kempf, Ann Arbor, MI (US); Adam Nelligan, Naperville, IL (US); Brian Smith, Novi, MI (US); Joseph Wesorick, Rockford, MI (US); Amar Shah, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 699 days.

(21) Appl. No.: 13/441,743

(22) Filed: Apr. 6, 2012

(65) Prior Publication Data

US 2013/0263590 A1 Oct. 10, 2013

(51) Int. Cl.
*F02M 25/08* (2006.01)
*F02D 41/00* (2006.01)
*F02B 33/00* (2006.01)

(52) U.S. Cl.
CPC ............ *F02M 25/0836* (2013.01); *F02B 33/00* (2013.01); *F02D 41/0032* (2013.01); *F02M 25/089* (2013.01); *F02D 41/0007* (2013.01); *F02D 2200/0406* (2013.01)

(58) Field of Classification Search
CPC F02M 25/08; F02M 25/0836; F02M 25/0809
USPC .................. 123/516, 518, 519, 520
See application file for complete search history.

(56) References Cited

U.S. PATENT DOCUMENTS

| | | | |
|---|---|---|---|
| 5,005,550 A | 4/1991 | Bugin et al. | |
| 5,979,418 A | 11/1999 | Saruwatari et al. | |
| 6,880,534 B2 | 4/2005 | Yoshiki et al. | |
| 6,910,467 B2 | 6/2005 | Murakami et al. | |
| 7,367,326 B2 * | 5/2008 | Shikama et al. | 123/520 |
| 7,743,752 B2 | 6/2010 | Kerns et al. | |
| 7,900,608 B2 | 3/2011 | Peters et al. | |
| 8,109,259 B2 * | 2/2012 | Ulrey et al. | 123/572 |
| 2005/0011498 A1 * | 1/2005 | Yoshiki et al. | 123/520 |
| 2007/0227515 A1 | 10/2007 | Uchida | |
| 2011/0030659 A1 | 2/2011 | Ulrey et al. | |
| 2011/0132311 A1 | 6/2011 | Pursifull et al. | |
| 2011/0132331 A1 * | 6/2011 | Pursifull | 123/478 |
| 2011/0307157 A1 * | 12/2011 | Pursifull | 701/102 |
| 2012/0016566 A1 | 1/2012 | Cunningham et al. | |
| 2012/0318243 A1 * | 12/2012 | Williams | 123/520 |
| 2013/0008413 A1 * | 1/2013 | Inoguchi et al. | 123/518 |
| 2013/0019844 A1 * | 1/2013 | Kulkarni et al. | 123/520 |
| 2013/0220282 A1 * | 8/2013 | Hadre et al. | 123/520 |

FOREIGN PATENT DOCUMENTS

JP 2009180095 8/2009

OTHER PUBLICATIONS

Ford Motor Company, "2011 MY OBD System Operation Summary for Gasoline Engines," Apr. 21, 2010, 251 pages.
"Canister Purge Valve," Robert Bosch GmbH, http://products.bosch-mobility-solutions.com/media/en/ubk_europe/db_application/downloads/pdf/antrieb/de_5/gs_datenbl_tev_de.pdf, 2013, 1 page.

* cited by examiner

*Primary Examiner* — Thomas Moulis
(74) *Attorney, Agent, or Firm* — James Dottavio; Alleman Hall McCoy Russell & Tuttle LLP

(57) ABSTRACT

Methods and systems for fuel vapor canister purging in boosted engines are described. In one example, vapors are purged from the canister into an engine intake passage downstream of a throttle via an ejector during vacuum conditions, whereas during boost conditions, vapors are purged from the canister into an upstream inlet of a compressor via the ejector, the compressor arranged in the intake passage upstream of the throttle.

20 Claims, 4 Drawing Sheets

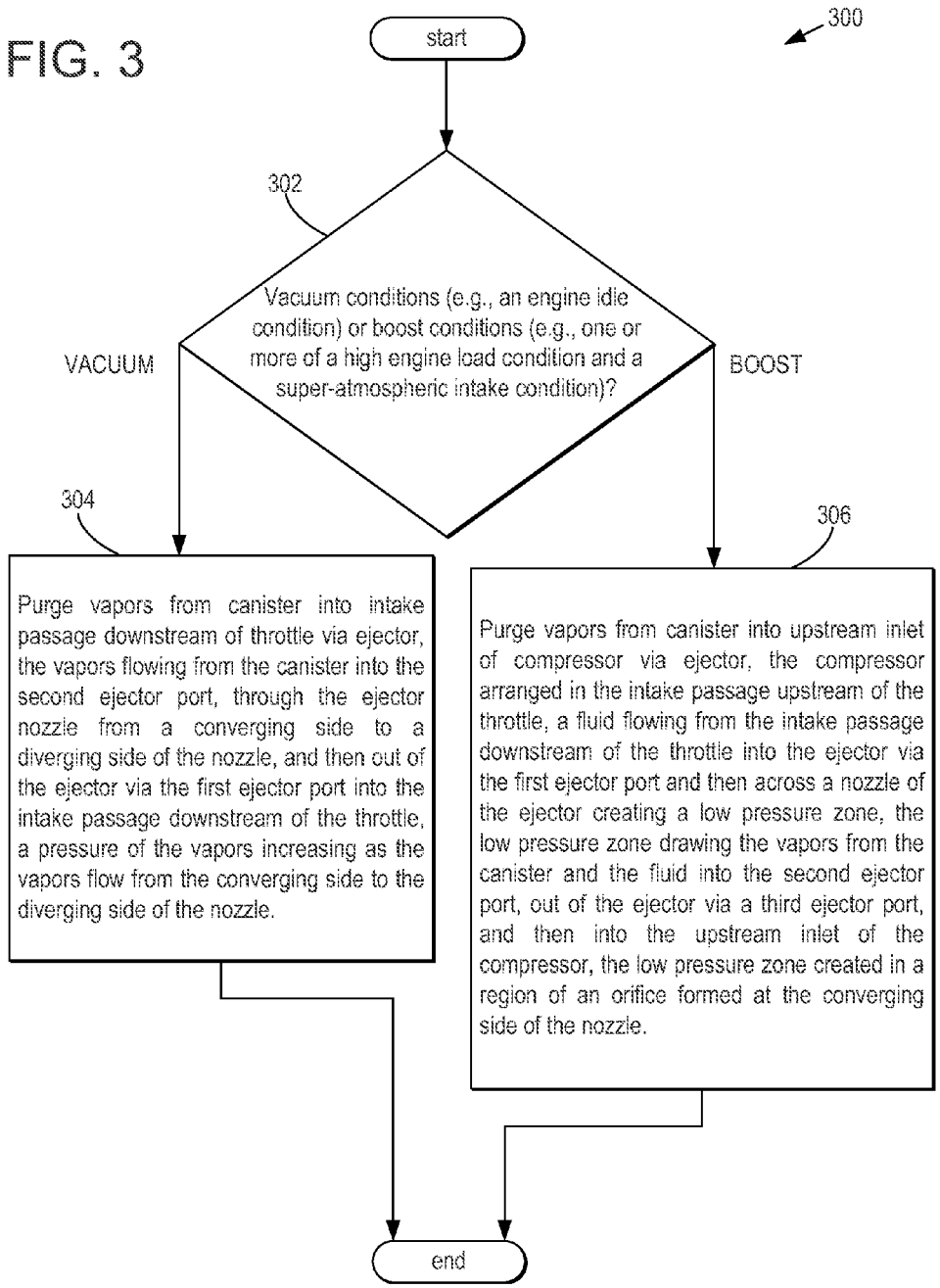

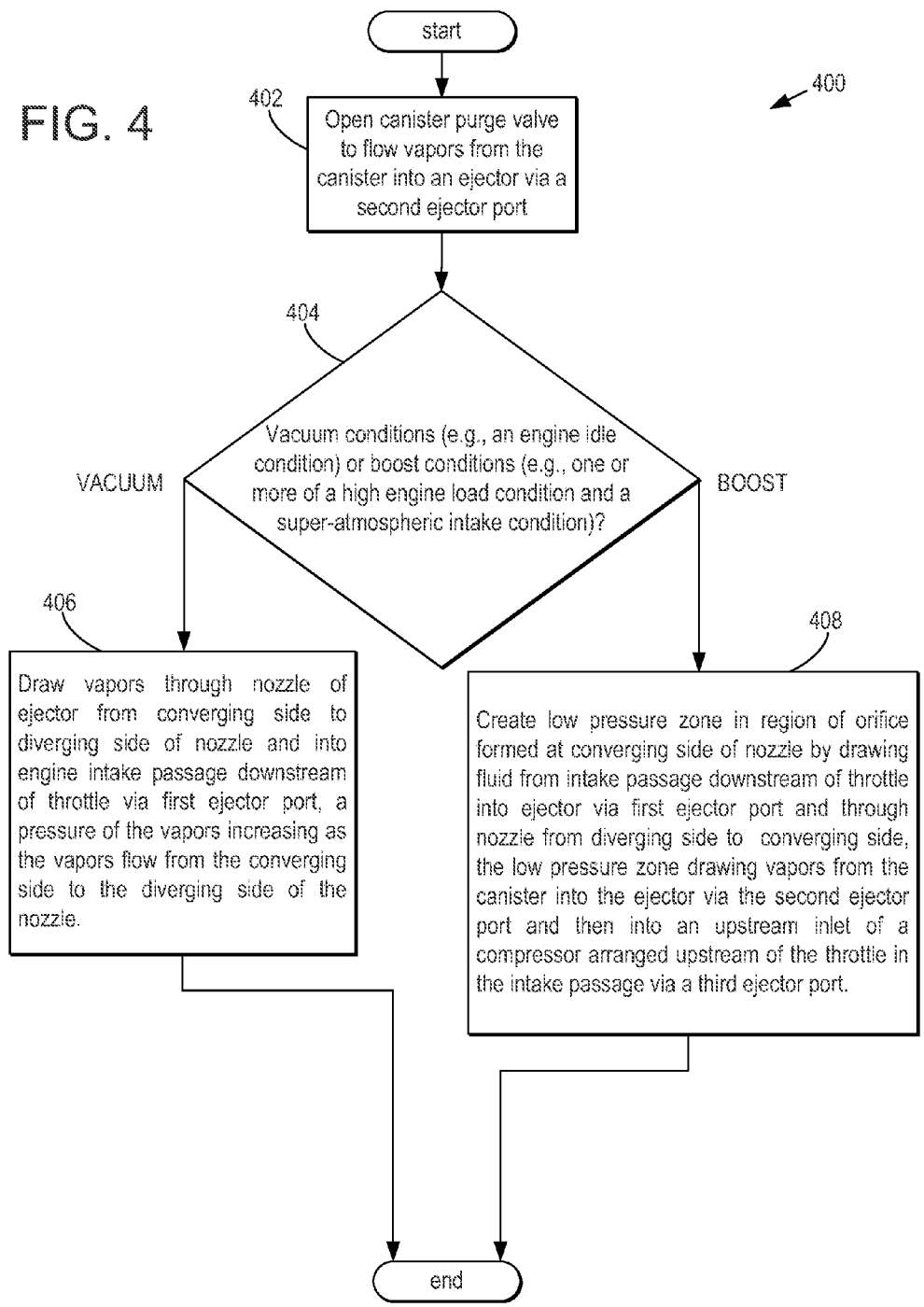

MODULAR DESIGN FOR FUEL VAPOR PURGING IN BOOSTED ENGINES

BACKGROUND AND SUMMARY

In automotive vehicles, fuel stored in an engine fuel tank may vaporize under certain conditions. Some engine evaporative emissions systems may utilize a carbon canister to collect vaporized fuel from the fuel tank, in order to save fuel and reduce release of fuel vapors to the atmosphere. The vapors stored in the canister are eventually released into the engine intake manifold during operation, a process which may be described as fuel vapor "purging". In this way, fuel vapors may be recycled to the engine rather than leaked to the environment.

Various approaches for carrying out fuel vapor purging may be used. For example, pressure differentials within the engine may be utilized to draw fuel vapors from the canister into the intake manifold. However, in boosted engines, intake manifold pressure may vary substantially depending on whether the compressor is operating. During vacuum conditions when the compressor is not operating, the intake manifold may have a negative pressure. In contrast, during boost conditions when the compressor is operating, the intake manifold may have a positive pressure. Approaches for fuel vapor purging in boosted engines must be able to carry out the purging during both vacuum conditions and boost conditions.

One system for fuel vapor purging in boosted engines is a dual-path system which utilizes two purge flow paths in order to purge under both vacuum conditions and boost conditions. The system includes a first mechanical check valve between the intake manifold and the canister purge valve (CPV), the first check valve preventing reverse flow through the system during boost conditions. The system further includes a second identical check valve between the CPV and an ejector, to facilitate purging during boost conditions. During non-boost conditions, purge vapors flow through the first check valve before entering the intake manifold. During boost conditions, the ejector is used to generate vacuum for purging. The purge vapors flow through the second check valve, then the ejector, then the compressor, and then a charge air cooler before entering the intake manifold.

However, the inventors herein have recognized that such dual-path systems have several disadvantages. Due to large number of connections and components required, the system may be costly and complex. For example, the system utilizes approximately 11 connections, two check valves, and an ejector. Further, because of the large number of connections, the system may be prone to leakage of vapors. Furthermore, because of the large number of connections and the discrete nature of the components, assembly may be difficult. For example, "plug-and-play" assembly may not be possible.

To address the above issues, the inventors herein have identified various approaches for fuel vapor purging in boosted engines. In one example approach, a method for engine fuel vapor canister purging comprises, during vacuum conditions, purging vapors from the canister into an engine intake passage downstream of a throttle via an ejector. The method further comprises, during boost conditions, purging vapors from the canister into an upstream inlet of a compressor via the ejector, the compressor arranged in the intake passage upstream of the throttle.

In this way, fuel vapor purging may be achieved in a boosted engine using with fewer connections. Whereas a dual-path system may utilize approximately 11 connections, the system described herein may include fewer connections, and thus may be less prone to undesirable fuel vapor leakage. Further, by reducing the number of connections and components, the system described herein may be less costly, and may facilitate assembly. For example, plug-and-play assembly may be possible, thus further reducing costs by simplifying and expediting manufacturing. Finally, the system described herein desirably maximizes vapor flow over the operating range, despite the reduced number of connections. That is, fuel vapor purging may be achieved when operating conditions are such that intake manifold pressure is either less than or greater than atmospheric pressure (e.g., vacuum conditions or boost conditions).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 is an example method for fuel vapor canister purging in a boosted engine, to be used in conjunction with the vehicle system and fuel vapor purging system depicted in FIGS. 1 and 2.

FIG. 4 is another example method for fuel vapor canister purging in a boosted engine, to be used in conjunction with the vehicle system and fuel vapor purging system depicted in FIGS. 1 and 2.

DETAILED DESCRIPTION

The following description relates to methods and systems for fuel vapor purging in vehicles with a boosted combustion engine, where a modular design is utilized to reduce the number of connections required, thereby ensuring more reliable leak prevention and facilitating assembly while decreasing overall costs.

Figure 1:
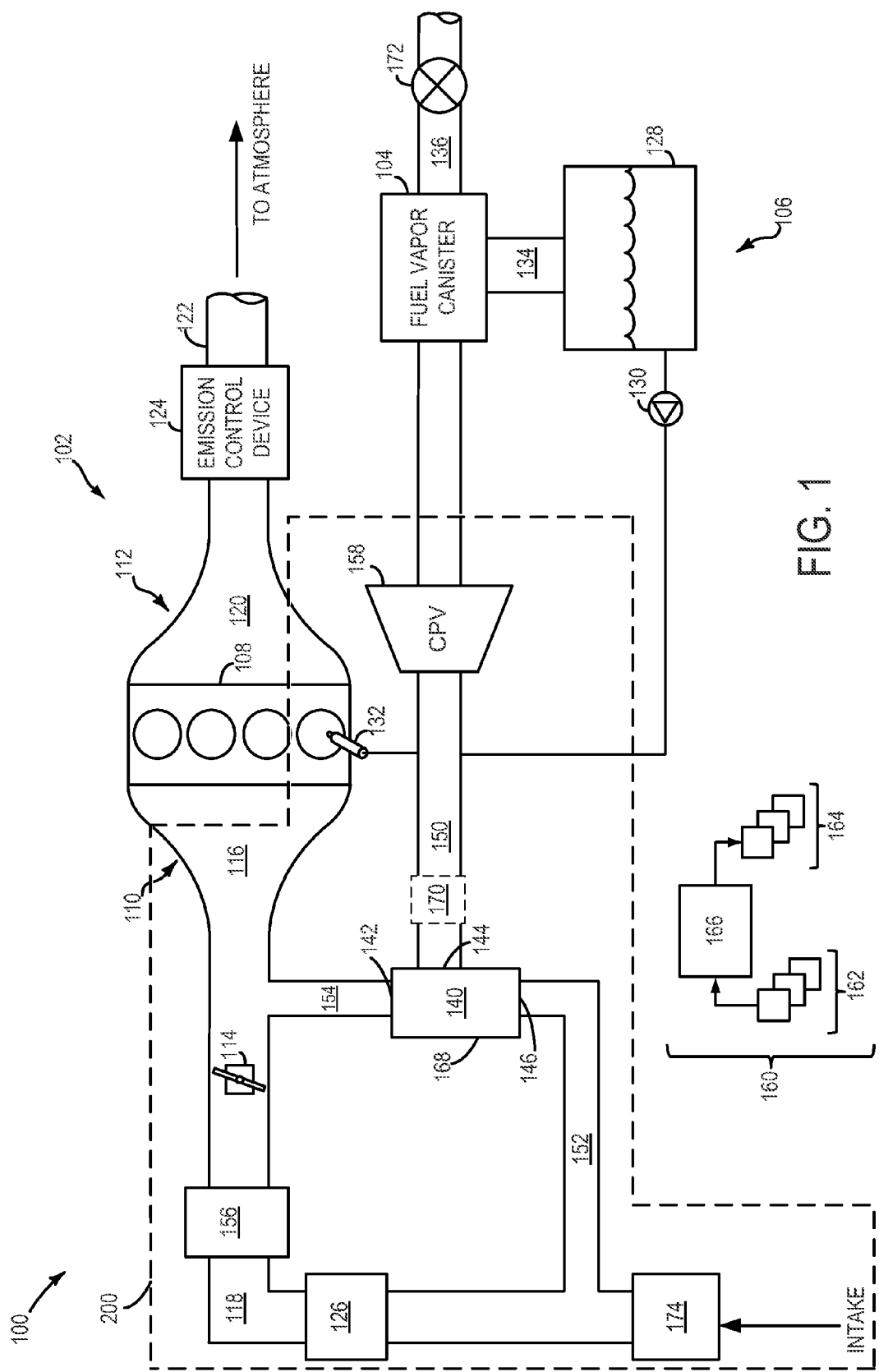
FIG. 1 is a schematic diagram of an example vehicle system.

FIG. 1 shows a schematic depiction of a vehicle system 100. The vehicle system 100 includes an engine system 102 coupled to a fuel vapor canister 104 and a fuel system 106. The engine system 102 may include an engine 108 having a plurality of cylinders. The engine 108 includes an engine intake 110 and an engine exhaust 112. The engine intake 110 includes a throttle 114 fluidly coupled to the engine intake manifold 116 via an intake passage 118. An air filter 174 may be arranged at an upstream end of intake passage 118, to prevent abrasive particulate matter from entering the engine cylinders. The engine exhaust 112 includes an exhaust manifold 120 leading to an exhaust passage 122 that routes exhaust gas to the atmosphere. The engine exhaust 112 may include one or more emission control devices 124, which may be mounted in a close-coupled position in the exhaust. One or more emission control devices may include a three-way catalyst, lean NOx trap, diesel particulate filter, oxidation catalyst, etc. It will be appreciated that other components may be included in the engine without departing from the scope of the invention.

The engine intake 110 further includes a boosting device, such as a compressor 126. Compressor 126 may be configured to draw in intake air at atmospheric air pressure and boost it to a higher pressure. As such, the boosting device may be a compressor of a turbocharger, where the boosted air is introduced pre-throttle. Using the boosted intake air, a boosted engine operation may be performed. A charge air cooler 156 may be arranged in intake passage 118 downstream of compressor 126, to cool the boosted air before it enters the engine in order to optimize available power for combustion.

Fuel system 106 may include a fuel tank 128 coupled to a fuel pump system 130. The fuel pump system 130 may include one or more pumps for pressurizing fuel delivered to the injectors of engine 108, such as the example fuel injector 132 shown. While only a single fuel injector 132 is shown, additional fuel injectors are provided for each cylinder. It will be appreciated that fuel system 106 may be a return-less fuel system, a return fuel system, or various other types of fuel system. Vapors generated in fuel system 106 may be routed to a fuel vapor canister 104, described further below, via conduit 134, before being purged via fuel vapor purging system 200. Conduit 134 may optionally include a fuel tank isolation valve. Among other functions, fuel tank isolation valve may allow the fuel vapor canister 104 to be maintained at a low pressure or vacuum without increasing the fuel evaporation rate from the tank (which would otherwise occur if the fuel tank pressure were lowered). The fuel tank 128 may hold a plurality of fuel blends, including fuel with a range of alcohol concentrations, such as various gasoline-ethanol blends, including E10, E85, gasoline, etc., and combinations thereof.

Fuel vapor canister 104 may be filled with an appropriate adsorbent and configured to temporarily trap fuel vapors (including vaporized hydrocarbons) during fuel tank refilling operations and "running loss" (that is, fuel vaporized during vehicle operation). In one example, the adsorbent used is activated charcoal. Fuel vapor canister 104 may further include a vent 136 which may route gases out of the canister 104 to the atmosphere when storing, or trapping, fuel vapors from fuel system 106. Vent 136 may also allow fresh air to be drawn into fuel vapor canister 104 when purging stored fuel vapors from fuel system 106 to intake 110 via fuel vapor purging system 200. While this example shows vent 136 communicating with fresh, unheated air, various modifications may also be used. Flow of air and vapors between fuel vapor canister 104 and the atmosphere may be regulated by the operation of a canister vent solenoid (not shown), coupled to canister vent valve 172.

Fuel vapor canister 104 operates to store vaporized hydrocarbons (HCs) from fuel system 106. Under some operating conditions, such as during refueling, fuel vapors present in the fuel tank may be displaced when liquid is added to the tank. The displaced air and/or fuel vapors may be routed from the fuel tank 128 to the fuel vapor canister 104, and then to the atmosphere through vent 136. In this way, an increased amount of vaporized HCs may be stored in fuel vapor canister 104.

During a later engine operation, the stored vapors may be released back into the incoming air charge via fuel vapor purging system 200. Fuel vapor purging system 200 includes ejector 140, which will be described in detail below with respect to FIGS. 2 and 3. Ejector 140 includes a housing 168. One or more check valves may be arranged within housing 168, as further described below with respect to FIG. 2. Further, ejector 140 includes a first port 142, a second port 144, and a third port 146. In one example, only these three ports are included. Duct 148 couples first port 142 of ejector 140 to intake passage 118 downstream of throttle 114. Duct 150 couples second port 144 of ejector 140 to fuel vapor canister 104. Duct 152 couples third port 146 of ejector 140 to intake passage 118 upstream of compressor 126 (i.e., at an upstream inlet of the compressor). Duct 152 may be coupled to intake passage 118 downstream of an air filter 174. A CPV 158 is arranged in duct 150, to regulate the flow of vapors from fuel vapor canister 104 to ejector 140. Optionally, a third check valve 170 may be included in duct 148 intermediate the ejector and the intake passage. As detailed below with respect to FIGS. 2 and 3, the ejector is designed such that during boost conditions, a low pressure zone is created in the ejector which draws fuel vapors from the CPV to the upstream inlet of the compressor. Under vacuum conditions, for example when intake manifold vacuum is present, fuel vapors are drawn from the CPV, through the ejector, to the intake manifold.

It should be appreciated that fuel vapor canister 104 is not coupled directly to intake passage 118 or intake 110. Rather, the canister is coupled to ejector 140 via duct 150, and ejector 140 is coupled to intake passage 118 upstream of compressor 126 via duct 152 and to intake passage 118 downstream of throttle 114 via duct 154. Further, it should be appreciated that fuel vapor canister 104 is coupled (via duct 150 and ejector 140) to intake passage 118 downstream of the throttle, and not upstream of the throttle. In this way, vapor flow from fuel vapor canister 104 passes through second port 144 of ejector 140 before continuing on to the intake passage via third port 146 or first port 142 of the ejector, depending on whether boost or vacuum conditions are present.

The vehicle system 100 may further include control system 160. Control system 160 is shown receiving information from a plurality of sensors 162 and sending control signals to a plurality of actuators 164. Sensors 162 may include pressure, temperature, air/fuel ratio, and composition sensors, for example. Actuators 164 may include fuel injector 132, CPV 158, and throttle 114, for example. The control system 160 may include a controller 166. The controller may receive input data from various sensors, process the input data, and trigger various actuators in response to the processed input data based on instruction or code programmed therein corresponding to one or more routines. For example, as detailed below with respect to FIG. 2, the controller may determine a duty cycle of a CPV solenoid based on engine operating conditions, the duty cycle of the CPV solenoid determining the quantity and rate of vapors released by CPV 158.

Figure 2:
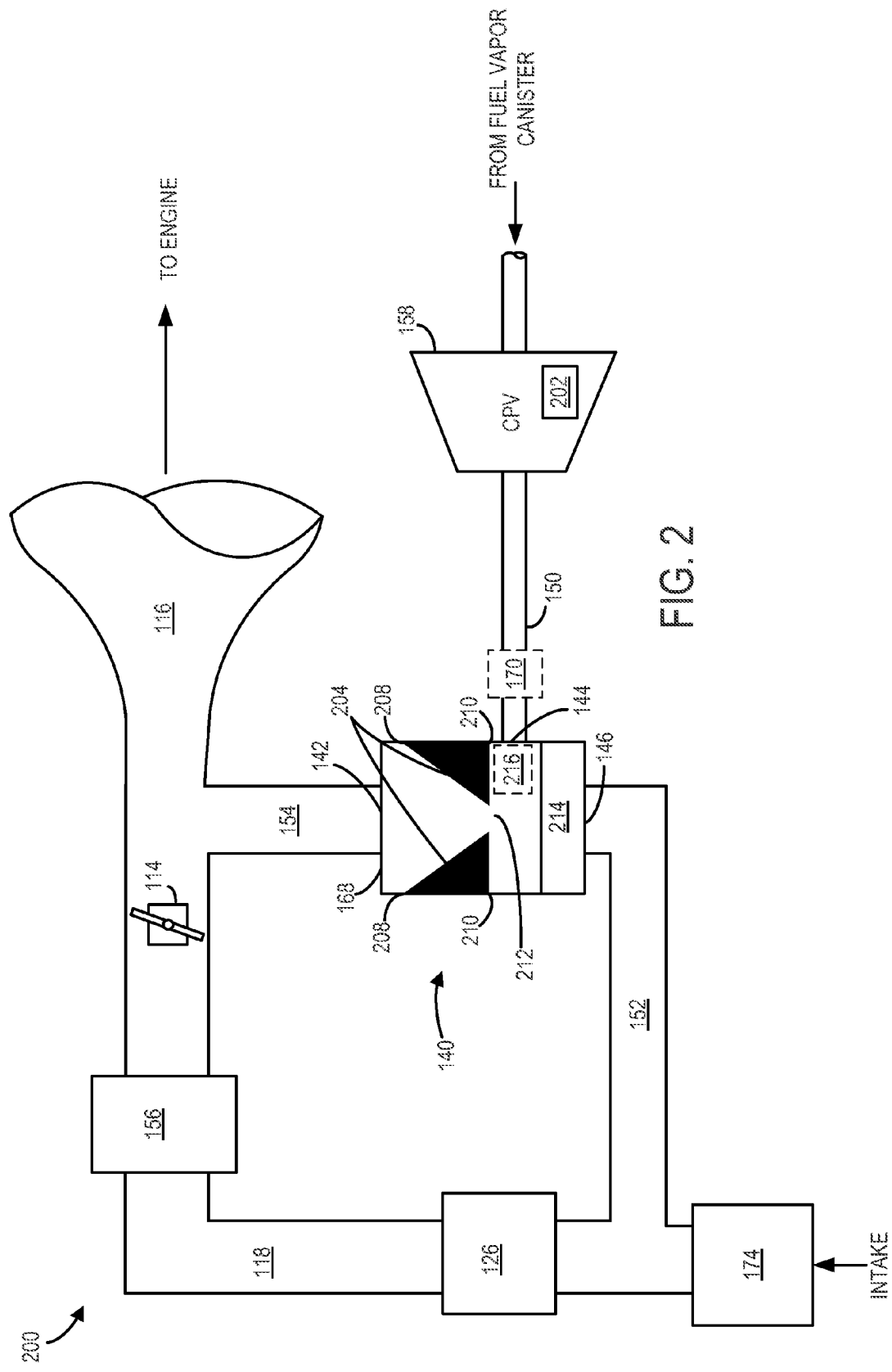
FIG. 2 is an enlarged schematic diagram of the fuel vapor purging system included in the vehicle system depicted in FIG. 1.

Referring now to FIG. 2, an enlarged schematic view of fuel vapor purging system 200 is shown. As shown in FIG. 2, vapors from the fuel vapor canister are in communication with ejector 140 via CPV 158. Specifically, CPV 158 may regulate the flow of vapors along duct 150. The quantity and rate of vapors released by CPV 158 may be determined by the duty cycle of an associated CPV solenoid 202. In one example, the duty cycle of the CPV solenoid may be determined by controller 166 responsive to engine operating conditions, including, for example, an air-fuel ratio. By commanding the CPV to be closed, the controller may seal the fuel vapor canister from the fuel vapor purging system, such that no vapors are purged via the fuel vapor purging system. In contrast, by commanding the CPV to be open, the controller may enable the fuel vapor purging system to purge vapors from the fuel vapor canister.

As described with respect to FIG. 1, ejector 140 includes housing 168, first port 142, second port 144, and third port 146. Further, as shown in FIG. 2, ejector 140 includes a nozzle 204, arranged within housing 168. Nozzle 204 includes a diverging side 208 and a converging side 210. An orifice 212 is formed at converging side 210 of nozzle 204. Additionally, ejector 140 includes a first check valve 214 arranged within housing 168. First check valve 214 is positioned adjacent to third port 146.

In one example, ejector 140 is a passive component. That is, ejector 140 is designed to route fuel vapor flow appropriately to accomplish purging under various conditions, without being actively controlled. Thus, whereas CPV 158 and throttle 114 may be controlled via controller 166, for example, ejector 140 is neither controlled via controller 166 nor subject to any other active control. In another example, the ejector may be actively controlled with a variable geometry.

During select engine and/or vehicle operating conditions, such as after an emission control device light-off temperature has been attained (e.g., a threshold temperature reached after warming up from ambient temperature) and with the engine running, the controller 166 may adjust the duty cycle of a canister vent valve solenoid (not shown) and open canister vent valve 172. At the same time, controller 12 may adjust the duty cycle of the CPV solenoid 202 and open CPV 158. Pressures within fuel vapor purging system 200 may then draw fresh air through vent 136, fuel vapor canister 104, and CPV 158 such that fuel vapors flow into second port 144 of ejector 140 via duct 150.

The operation of ejector 140 within fuel vapor purging system 200 during vacuum conditions will now be described. The vacuum conditions may include intake manifold vacuum conditions. For example, intake manifold vacuum conditions may be present during an engine idle condition, with manifold pressure below atmospheric pressure by a threshold amount. Upon entering the ejector via second port 144, the fuel vapors flow through nozzle 204 from converging side 210 to diverging side 208. Specifically, the intake manifold vacuum causes the fuel vapors to flow through orifice 212. Because the diameter of the area within the nozzle gradually increases from the converging side to the diverging side thereof, the fuel vapors flowing through the nozzle in this direction diffuse, which raises the pressure of the fuel vapors. After passing through the nozzle, the fuel vapors exit ejector 140 through first port 142 and flow through duct 154 to intake passage 118 and then to intake manifold 116.

Next, the operation of ejector 140 within fuel vapor purging system 200 during boost conditions will be described. The boost conditions may include conditions during which the compressor is in operation. For example, the boost conditions may include one or more of a high engine load condition and a super-atmospheric intake condition, with intake manifold pressure greater than atmospheric pressure by a threshold amount.

Fresh air enters intake passage 118 at air filter 174. During boost conditions, compressor 126 pressurizes the air in intake passage 118, such that intake manifold pressure is positive. Pressure in intake passage 118 upstream of compressor 126 is lower than intake manifold pressure during operation of compressor 126, and this pressure differential induces a flow of fluid from intake manifold 116 through duct 154 and first port 142 of ejector 140. This fluid may include a mixture of air and fuel, for example. After the fluid flows into the ejector via the first port, it flows from the diverging side to the converging side of the nozzle. Because the diameter of the nozzle gradually decreases from the diverging side to the converging side thereof, a low pressure zone is created in a region of orifice 212. The pressure in this low pressure zone may be lower than a pressure in duct 150. When present, this pressure differential induces flow of fuel vapors from the fuel vapor canister, through the CPV, and into second port 144 of ejector 140. Upon entering the ejector, the fuel vapors may be drawn along with the fluid from the intake manifold out of the ejector via third port 146 and into duct 152. Operation of compressor 126 then draws the fluid and fuel vapors from duct 152 into intake passage 118 and through the compressor. After being compressed by compressor 126, the fluid and fuel vapors flow through charge air cooler 156, for delivery to intake manifold 116 via throttle 114.

First check valve 214 is arranged within housing 168 of ejector 140, adjacent to third port 146. First check valve 214 may prevent intake air from flowing through duct 152 into third port 146 of ejector 140, while allowing flow of fluid and fuel vapors from ejector 140 to intake passage 118 upstream of compressor 126 via duct 152.

Optionally, a third check valve 170 may be arranged in duct 150 intermediate CPV 158 and second port 144, outside of housing 168 (i.e., third check valve 170 is not incorporated in ejector 140 but rather is a separate component). Third check valve 170 may prevent backflow of fuel vapors from the ejector to the CPV under low boost conditions, for example. Alternatively, a second check valve 216 may be arranged within housing 168 of ejector 140, for example adjacent to second port 144. Like third check valve 170, second check valve 216 may prevent backflow of fuel vapors from the ejector to the CPV. However, unlike third check valve 170, second check valve 216 requires no extra connections because it is incorporated as part of ejector 140, within housing 168.

FIG. 3 schematically shows an example method 300 that may be used in conjunction with vehicle system 100 and fuel vapor purging system 200, for fuel vapor purging in boosted engines.

At 302, depending on whether vacuum or boost conditions are present, method 300 continues to 304 or 306. For example, vacuum conditions may include an engine idle condition, and boost conditions may include one or more of a high engine load condition and a super-atmospheric intake condition.

If vacuum conditions are present, method 300 continues to 304. At 304, method 300 includes purging vapors from the canister into an engine intake passage downstream of a throttle via an ejector, the vapors flowing from the canister into a second ejector port, through an ejector nozzle, and then out of the ejector via a first ejector port into the intake passage downstream of the throttle. At 304, method 300 further includes the vapors flowing across the nozzle from a converging side to a diverging side of the nozzle, a pressure of the vapors increasing as the vapors flow from the converging side to the diverging side of the nozzle.

However, if boost conditions are present, method 300 continues from 302 to 306. At 306, method 300 includes purging vapors from the canister into an upstream inlet of a compressor via the ejector, the compressor arranged in the intake passage upstream of the throttle. At 306, method 300 further includes a fluid flowing from the intake passage downstream of the throttle into the ejector via the first ejector port and then across a nozzle of the ejector creating a low pressure zone, the low pressure zone drawing the vapors from the canister and the fluid into the second ejector port, out of the ejector via a third ejector port, and then into the upstream inlet of the compressor, where the low pressure zone is created in a region of an orifice formed at the converging side of the nozzle.

In this way, method 300 takes advantage of the different pressures that exist in the intake manifold during vacuum and boost conditions to enact fuel vapor purging. Specifically, because the ejector is coupled between the canister and the intake manifold, between the canister and the upstream inlet of the compressor, and between the intake manifold and the upstream inlet of the compressor, pressure differentials between the canister, intake manifold, and intake passage upstream of the compressor induce flow of canister vapors and fluid in the intake manifold along different paths depending on whether vacuum or boost conditions are present. As such, a relatively simple fuel vapor purging system may be used, where the ejector takes the place of the numerous connections and components that some systems require to achieve the same function. For example, during vacuum conditions, the intake manifold vacuum induces vapor flow from the canister into the ejector and across the nozzle from a converging side to a diverging side of the nozzle, a pressure of the vapors increasing as the vapors flow from the converging side to the diverging side of the nozzle. In this way, the vacuum that exists in the intake manifold during vacuum conditions enables fuel vapor purging, while the geometry of the ejector nozzle advantageously increases vapor pressure before it reaches the intake manifold to improve combustion. Further, during boost conditions, the intake manifold pressure may exceed the pressure upstream of the compressor. This induces fluid flow from the intake manifold into the ejector, and the geometry of the ejector nozzle creates a low pressure zone as the fluid flows through it. This low pressure zone then induces vapor flow from the canister through the ejector and into the upstream inlet of the compressor, thus purging the canister. Thus, without actively influencing pressures within the system (for example by actuating valves based on operating conditions), fuel vapor purging is achieved via method 300.

FIG. 4 schematically shows another example method 400 that may be used in conjunction with vehicle system 100 and fuel vapor purging system 200, for fuel vapor purging in boosted engines.

At 402, method 400 includes opening a CPV to flow vapors from the canister into an ejector via a second ejector port. After 402, method 400 continues to 404.

At 404, depending on whether vacuum or boost conditions are present, method 400 continues to 406 or 408. For example, vacuum conditions may include an engine idle condition, and boost conditions may include one or more of a high engine load condition and a super-atmospheric intake condition.

If vacuum conditions are present, method 400 continues from 404 to 406. At 406, method 400 includes drawing the vapors through a nozzle of the ejector from a converging side to a diverging side of the nozzle and into an engine intake passage downstream of a throttle via a first ejector port, a pressure of the vapors increasing as the vapors flow from the converging side to the diverging side of the nozzle.

However, if boost conditions are present, method 400 continues from 404 to 408. At 408, method 400 includes creating a low pressure zone in a region of an orifice formed at the converging side of the nozzle by drawing a fluid from the intake passage downstream of the throttle into the ejector via the first ejector port and through the nozzle from the diverging side to the converging side, the low pressure zone drawing vapors from the canister into the ejector via the second ejector port and then into an upstream inlet of a compressor arranged upstream of the throttle in the intake passage via a third ejector port.

In this way, similar to method 300, method 400 achieves fuel vapor purging during both vacuum and boost conditions by taking advantage of the different pressures existing in the intake manifold during these conditions. Further, method 400 controls a CPV such that fuel vapor purging is only carried out as needed. For example, if fuel vapor purging is desired, a CPV may be opened to allow flow of vapors from the canister to the ejector. If vacuum conditions are present, intake manifold vacuum induces vapor flow from the converging side to the diverging side of the ejector nozzle and into the intake passage. Due to the geometry of the nozzle, the pressure of the vapors may increase as the vapors flow through the nozzle towards the intake manifold, thereby advantageously improving combustion. Further, if boost conditions are present, intake manifold pressure may be higher than a pressure upstream of the compressor. This pressure differential induces fluid flow from the intake manifold through the ejector nozzle, creating a low pressure zone in a region of an orifice formed at the converging side of the nozzle. This low pressure zone induces vapor flow from the canister into the ejector and then into the upstream inlet of the compressor, which purges the fuel vapor canister. Thus, when fuel vapor purging is desired, it may be achieved by opening a CPV and then allowing the pressures that already exist in the system during vacuum and boost conditions to enact the purging, without a need for active control of valves to influence pressures within the system.

It will be appreciated that methods 300 and 400 are provided by way of example, and thus, are not meant to be limiting. Therefore, it is to be understood that methods 300 and 400 may include additional and/or alternative steps than those illustrated in FIGS. 3 and 4, respectively, without departing from the scope of this disclosure. Further, it will be appreciated that methods 300 and 400 are not limited to the order illustrated; rather, one or more steps may be rearranged or omitted without departing from the scope of this disclosure.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the example routines may graphically represent code to be programmed into the computer readable storage medium in the controller.

The various ducts and passages referred to herein can encompass various forms of conduits, passages, connections, etc., and are not limited to any specific cross-sectional geometry, material, length, etc.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
    during vacuum conditions, purging canister vapors into a converging side of a nozzle, out of a diverging side of the nozzle, and into an engine intake downstream of a throttle, the throttle downstream of a compressor; and
    during boost, purging vapors from the canister into a zone between the converging side and a compressor inlet, the vapors not passing through the diverging side of the nozzle before entering the compressor inlet.

2. The method of claim 1, wherein the nozzle and the zone are arranged in a housing, and wherein purging the vapors from the canister during vacuum conditions comprises the vapors flowing from the canister into a second port of the housing, from the converging side to the diverging side of the nozzle, and then out of the housing via a first port of the housing and into the intake downstream of the throttle.

3. The method of claim 2, wherein purging the vapors from the canister during boost comprises flowing a fluid from the intake downstream of the throttle into the first port of the housing, from the diverging side to the converging side of the nozzle, and the flow of fluid from the diverging side to the converging side of the nozzle decreasing a pressure in the zone, the decreased pressure in the zone drawing the vapors from the canister into the second port of the housing, out of the housing via a third port of the housing arranged between the zone and the compressor inlet, and then into the inlet of the compressor.

4. The method of claim 3, wherein during vacuum conditions, a pressure of the vapors increases as the vapors flow from the converging side to the diverging side of the nozzle.

5. The method of claim 4, wherein the zone is arranged between an orifice formed at the converging side of the nozzle and the third port of the housing.

6. The method of claim 3, wherein no valves are arranged between the first port of the housing and the intake passage, and wherein no valves are arranged between the third port of the housing and the inlet of the compressor, and wherein the nozzle is not subject to any active control.

7. The method of claim 1, wherein the canister is only coupled to the intake via the housing, and is not directly coupled to the intake or to an engine intake manifold.

8. The method of claim 1, wherein boost includes one or more of a high engine load condition and a super-atmospheric intake condition, and wherein the vacuum conditions include an engine idle condition.

9. A reverse purge system for a turbocharged engine, comprising:
    a nozzle and a first check valve arranged in a housing, the nozzle having a converging side and a diverging side an orifice formed at the converging side, and a zone disposed within the housing between the orifice and the first check valve;
    a first port of the housing coupled with an intake of the engine downstream of a throttle;
    a fuel vapor canister coupled with a second port of the housing; and
    an inlet of a compressor coupled with a third port of the housing.

10. The system of claim 9, wherein the compressor is arranged in the intake upstream of the throttle, wherein an air filter is arranged upstream of the compressor in the intake, and wherein the third port is coupled with the inlet of the compressor downstream of the air filter.

11. The system of claim 9, wherein a charge air cooler is positioned in the intake downstream of the compressor and upstream of the throttle, and wherein the housing only has three ports.

12. The system of claim 9, wherein a canister purge valve and associated canister purge valve solenoid are positioned between the canister and the second port, and wherein an engine controller controls the canister purge valve via the canister purge valve solenoid to regulate a flow of vapors from the canister into the second port, and wherein the nozzle is not subject to any active control.

13. The system of claim 12, wherein a second check valve is arranged within the housing adjacent to the second port, and wherein the first check valve is adjacent to the third port.

14. The system of claim 12, further comprising a third check valve upstream of the second port and downstream of the canister purge valve, where the third check valve is not arranged within the housing.

15. The system of claim 9, wherein a pressure in the zone during boost is lower than a pressure in the zone during vacuum conditions.

16. A method for engine fuel vapor canister purging, comprising:
    opening a canister purge valve to flow vapors from the canister into a zone disposed in a housing via a second port of the housing;
    during vacuum conditions, drawing the vapors from the zone, into a converging side of a nozzle arranged in the housing, out of a diverging side of the nozzle, and into an engine intake passage downstream of a throttle via a first port of the housing; and
    during boost, creating a low pressure in the zone by drawing a fluid from the intake passage downstream of the throttle into the first port and through the nozzle from the diverging side to the converging side, the low pressure in the zone drawing vapors from the canister into the zone of the housing via the second port and then into an upstream inlet of a compressor arranged upstream of the throttle in the intake passage via a third port of the housing, where the vapors do not pass through the diverging side of the nozzle after entering the second port and before exiting the third port.

17. The method of claim 16, wherein during vacuum conditions, a pressure of the vapors increases as the vapors flow from the converging side to the diverging side of the nozzle.

18. The method of claim 16, wherein no valves are arranged between the housing and the intake passage downstream of the throttle, and wherein no valves are arranged between the housing and the upstream inlet of the compressor.

19. The method of claim 16, wherein the canister is only coupled to the intake passage via the housing, and is not directly coupled to the intake passage or to an engine intake manifold, and wherein the nozzle is not subject to any active control.

20. The method of claim 16, wherein boost includes one or more of a high engine load condition and a super-atmospheric intake condition, and wherein the vacuum conditions include an engine idle condition.

* * * * *